March 15, 1966 F. W. LOOSCHEN 3,241,134

BIDIRECTIONAL TRANSLATOR

Filed Feb. 8, 1963 3 Sheets-Sheet 1

INVENTOR.
FLOYD W. LOOSCHEN

BY

Christie, Parker & Hale
ATTORNEYS.

INVENTOR.
FLOYD W. LOOSCHEN

BY

Christie, Parker & Hale
ATTORNEYS.

INVENTOR.
FLOYD W. LOOSCHEN
BY
Christie, Parker & Hale
ATTORNEYS.

United States Patent Office 3,241,134

Patented Mar. 15, 1966

3,241,134
BIDIRECTIONAL TRANSLATOR

Floyd William Looschen, Arcadia, Calif., assignor to Burroughs Corporation, Detroit, Mich., a corporation of Michigan Filed Feb. 8, 1963, Ser. No. 257,242
8 Claims. (Cl. 340—347)

This invention relates to the translation of a signal from one code to another code, and it is particularly useful in bidirectional translation of characters between a plurality of selectable codes.

In the transmission of data, the information being transmitted is often in the form of a code. For example, information transmitted over teletype facilities is in the form of a selected binary code, each character transmitted having a unique code. A typical means for coding the characters comprises a plurality of individual input lines, upon which each letter of the alphabet, the numbers to be used, and other selected characters are impressed. The output of the coding means commonly comprises 6 leads for transferring the signal, which has a unique binary code having a 6 bit content, from the coding means to a point of utilization or to apparatus for further processing. Each of the output leads has an output that represents a binary digit. This output may be designated either true or false, where a true output is either positive or negative voltage or zero potential depending upon which type of logic, positive or negative, is being employed. A false output may also be a positive or negative voltage or zero potential. By employing a 6 bit output, it is possible to uniquely code in binary form up to 64 characters. The binary digit could also be represented by other conditions at the output of the coding means and need not be limited to voltage levels.

In the teletype art, a particular binary code for each character has been found to be particularly advantageous. However, in the computer art, an entirely different binary code for each particular character has been found to be more advantageous and, therefore, the same character may have two entirely different codes depending on where it is used in the two individual arts. It is often necessary to take information received from a teletype facility and to feed it into a computer for processing. It thereupon becomes necessary to provide a means of translation between the teletype code and the computer code. One way to translate is to employ a decoder to receive the teletype coded characters and to impress each of the characters upon an individual output line. The output lines are thereafter connected to an encoder, which will change each character into a signal having a unique bit content according to the selected computer code. The terms "decoder," "encoder" and "translator" are terms of the computer art and are defined in the "Proceedings of the IRE," September 1956, pages 1166 through 1173.

The reverse process may also be required, i.e., the output is taken from a computer and applied to a teletype facility. Such an operation will require the reverse of the above described translation, the translation now being from the computer code to the teletype code. This reverse translation will also require a translator, including a decoder and an encoder, which is designed to translate from the computer code to the teletype code.

The decoder and encoder of the translator are relatively expensive, with the encoder often being one of the most expensive items of the system. Therefore, it would be desirable to have a single translator, a bidirectional translator, which could translate between two codes rather than requiring two complete translators for each translation involved. However, a design of a single bidirectional translator is not readily apparent. An approach employing two decoders and a single encoder, for example, requires the proper interconnection of the outputs of the decoders to the encoder to produce an effective bidirectional translator. This interconnection cannot be done in a random fashion, but must be done with a knowledge of the codes involved.

Therefore, in accordance with the invention, there is provided a bidirectional translator which will change a character from one code to another code and will also perform the reverse translation. The bidirectional translator comprises a first means, a decoder, for transferring individual characters having a first code from a coded input to an individual line output and a second means, a decoder, for transferring individual characters having a second code from a coded input to an individual line output. The translator further comprises a single means, an encoder, for alternately and selectively coding the output of the first transferring means with the second code and for coding the output of the second transferring means with the first code.

Additionally, each output line of the first decoder is connected to a selected output line of the second decoder through appropriate connecting means. The output of each individual connecting means is then connected to the proper input line of the encoder. It is first determined which character of the first code has the same bit content as a particular character of the second code. Then the output line of the first decoder, which has the particular character of the second code applied, is connected to the same connecting means as the output line of the second decoder, which has impressed thereon the predetermined character of the first code. This procedure is followed for each character involved.

In view of the economy realized from the bidirectional translator in eliminating one encoder, it is further desirable to provide a translator which is not limited to two codes but may be employed for the translation of characters between a plurality of selectable codes.

Therefore, in accordance with the invention, there is provided a translator that will translate between any number of selected codes. The translator comprises, in addition to a single encoder, a plurality of decoders equal in number to the number of translations desired. The output character lines of the decoders are selectively connected to individual output lines of every other decoder through appropriate connecting means. Thereafter, each connecting means is selectively connected to an input line of the single encoder. The proper connection of the output lines of the decoders is again determined by the particular codes involved.

The above and other features and advantages of the invention will be understood more clearly and fully upon consideration of the following specification and drawing in which.

Figure 1:
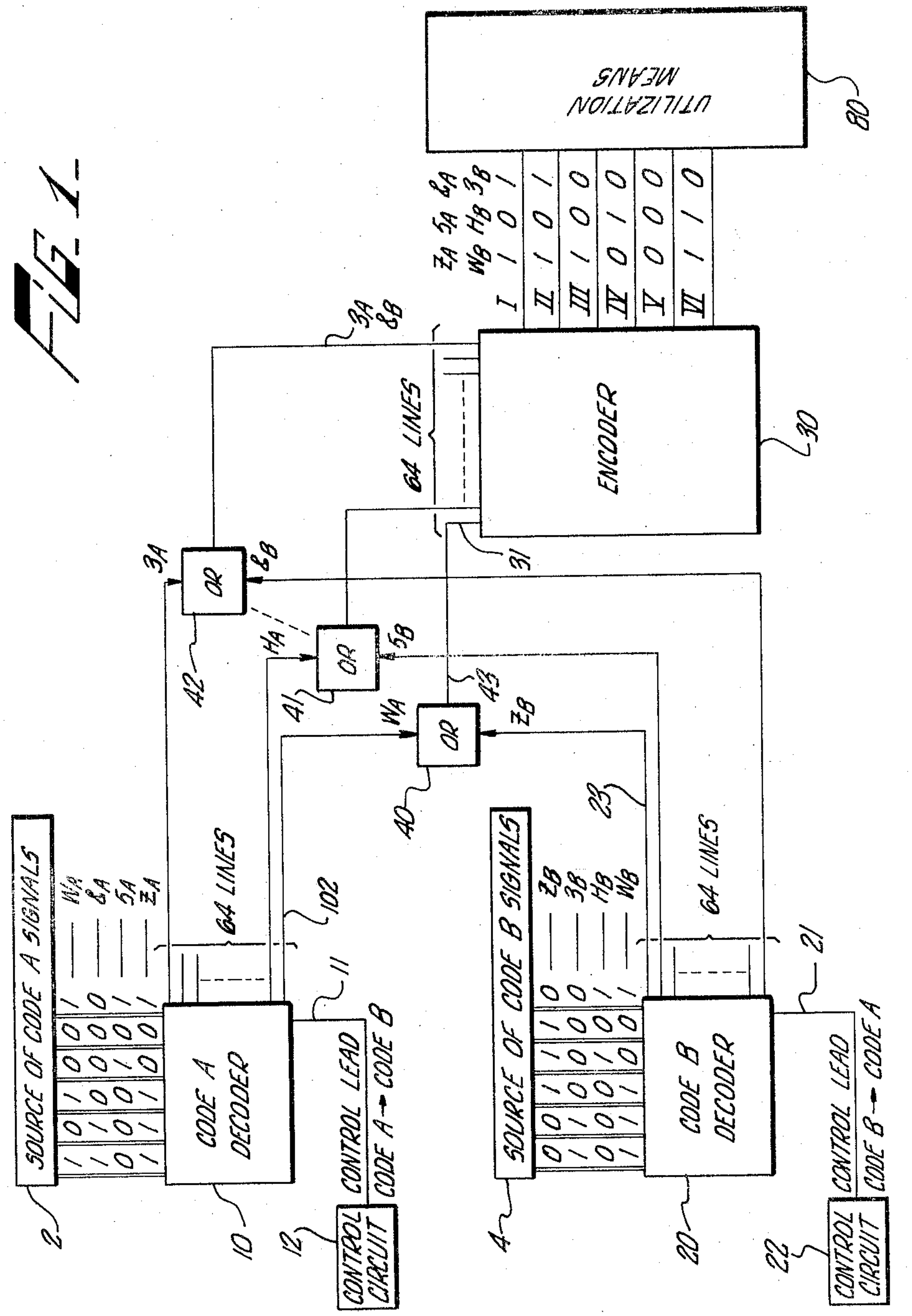
FIG. 1 is a block diagram of a bidirectional translator, in accordance with the invention.

The bidirectional translator of FIG. 1 is designed to translate between two distinct codes which may be, for example, the codes commonly employed in the teletype art and in the computer art. However, for illustrative purposes, the codes will be herein designated code A and code B and are not to be limited to or associated with any particular art.

The translator comprises a decoder 10 for translating an input signal having a selected bit content according to code A to an output signal associated with an individual line of 64 lines. The input is taken from a source 2 of a code A signals. The bidirectional translator further comprises a second decoder 20 for decoding signals having a code B, which are taken from a source 4 of code B signals. The output of decoders 10 and 20 are combined in appropriate connecting means, which may be some form of logic circuitry. Thereafter, the signal is applied to one of the 64 input lines of an encoder 30. The encoder 30 codes the individual characters which appear on one of its 64 input lines into a signal having a unique bit content of either code A or code B. Thereafter, the newly coded signal is applied to a utilization means 80.

The individual outputs of the decorders must be properly interconnected and the combination connected to a certain input of the encoder. It is not readily apparent how these outputs should be combined to produce a bidirectional translator. A typical example will be employed to illustrate the proper connection of the output of the decoders to produce a bidirectional translator, in accordance with the invention. However, the example will be more easily understood after a description of the action of a decoder is considered.

Figure 2:
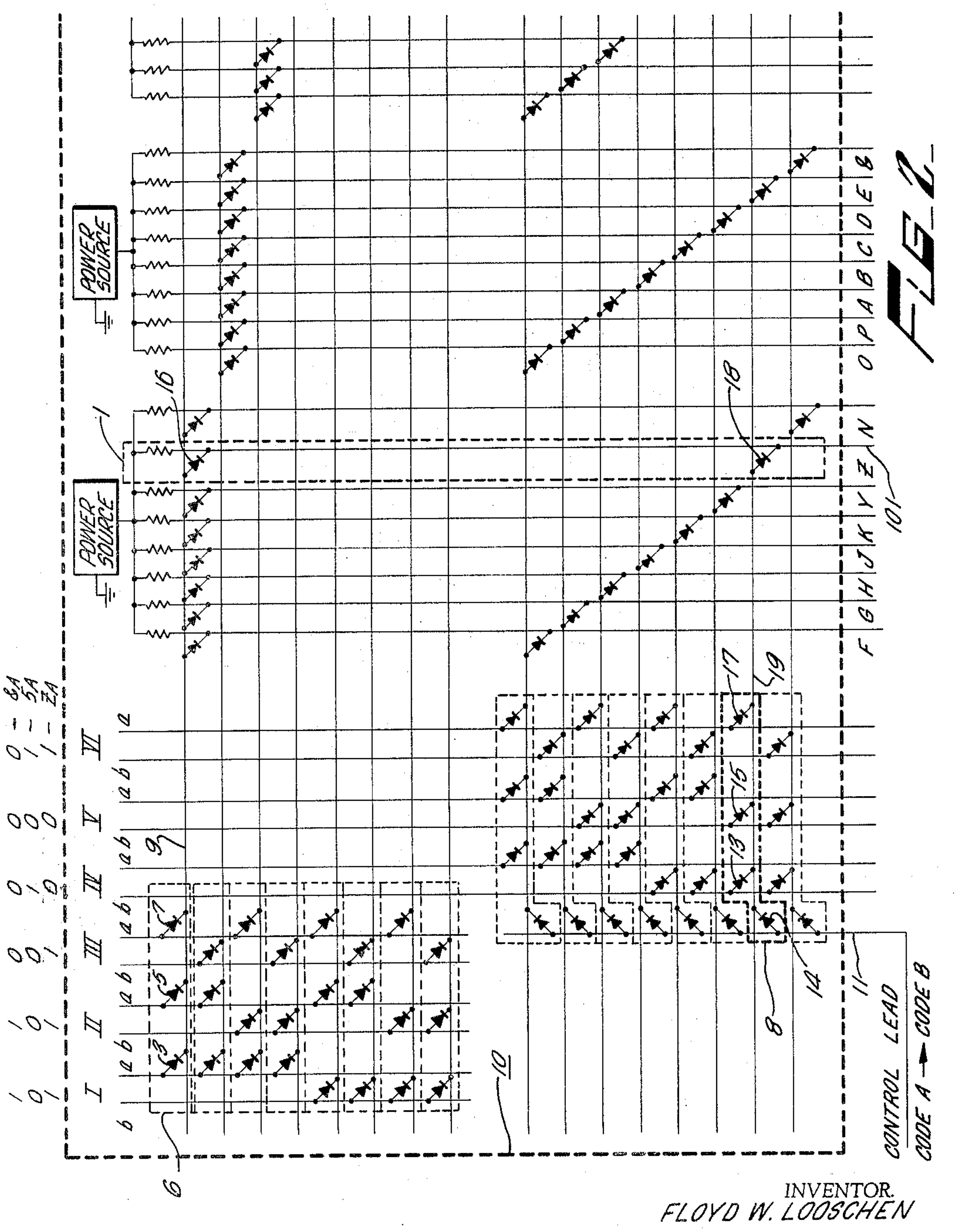
FIG. 2 is a rectangular array of a portion of the decoder employed in the bidirectional translator of FIG. 1.

The individual action of a decoder is best understood by the following description of decoder 10, which is shown in detail by the rectangular matrix in FIG. 2. The input lines to the decoder are numbered with Roman numerals for identification purposes and include lines I, II, III, IV, V, and VI. It is noted that in this typical decoder, there are 12 input lines which are paired. The paired input lines provide for a binary digit and its complement. Thereafter, a true input will be applied to one line *a* and a false input will be applied to another line *b*. However, it is noted that the input signals to the decoder could be by way of individual leads rather than paired leads with some other apprapriate way of designating the binary signal.

The first three pairs of input leads I, II, III are selecselectively connected to 8 different AND gates which are typically represented by the 3 input lead AND gate 6. The 3 input leads I*a*, II*a* and III*a* are coupled through diodes 3, 5 and 7, respectively, of AND gate 6 to a common output lead 9. The other 3 input lead AND gates similarly have their 3 input leads connected connected to an input signal and have a common output lead for each gate. Each output lead of the 3 input lead AND gates is associated with a group of 8 individual character lines. For example, output line 9 is associated with the first 8 individual character lines upon which characters F, G, H, J, K, Y, Z and N appear. Only one other group of 8 character lines are shown in FIG. 2, but it is understood that the other 6 groups to complete the assumed 64 character lines are similar and would be positioned to the right of those shown.

The other 3 pairs of input leads IV, V and VI to the decoder 10 are similarly selectively connected to 8 different AND gates of which gate 8 is typical. These gates have an extra input lead 11 from the control circuit which controls the over-all operation of the decoder. In the typical AND gate 8, the 3 input leads IV*b*, V*b*, VI*a* are coupled through diodes 13, 15 and 17, respectively, to a common output lead 19. The other input lead to the 4 input lead AND gate 8 is from the control circuit 12 (FIG. 1) through control lead 11. The control signal is applied to gate 8 and is coupled to lead 19 through diode 14.

The output lead 19 is associated with only one character line in each group of 8 character lines. For example, in the first group of character lines, lead 19 is associated through diode 18 with character line 101 which is assigned to character Z.

It is noted that the decoders 10 and 20 of FIG. 1 are substantially the same as prior art devices with the exception of the addition of control lead 11 to decoder 10 and control lead 21 to decoder 20 for the selection of the translation to be performed.

The bit content of 3 characters for code A are shown at the input of decoder 10 in FIG. 2. The characters selected are "Z," "5" and the character "&." It is assumed that for character Z the bit content is 111001, which represents a true signal for the first 3 pairs of input leads I, II, III, respectively, a false signal for the fourth and fifth pairs of input leads IV and V, respectively, and a true signal for the last pair of input leads VI. For illustrative purposes, it is assumed that the diodes of the AND gates are poled as shown and that a true input represents a positive voltage on an *a* lead and a false input represents a positive voltage on a *b* lead. Thereafter, for character Z diodes 3, 5 and 7 of AND gate 6 will be forward biased and an output will appear on common lead 9. This output will be transferred by lead 9 to the first group of 8 character lines and will forward bias the diodes in each line. Each diode associated with line 9 in the first group of 8 character lines operates in conjunction with another diode in the character line to form a 2 input lead AND gate of which AND gate 1, in character line 101, is typical. Therefore, even though each diode in the first group of 8 character lines is forward biased, there is no output on the character line until the associated diode in its respective AND gate is forward biased.

The assumed code for the character Z will forward bias diodes 13, 15 and 17 in AND gate 8, by the application of a false signal on lines IV*b* and V*b* and a true signal on lead VI*a*. If the fourth diode 14 in AND gate 8 is forward biased by the application of a control signal from lead 11 to effect this translation from code A, an output will appear on line 19. This output will forward bias diode 18 in AND gate 1. Since the other diode 16 of AND gate 1 is also forward biased, there will be an output on character line 101 to represent character Z.

Similarly the other code A characters, which appear at the input to decoder 10, will be transferred to individual character lines through the decoder.

The proper connection of the output of the decoders 10 and 20 of FIG. 1 may now be more easily understood. It is assumed, for illustrative purposes, that the bit content for the character "W" of code B is the same as the bit content for the character Z of code A. Additionally, character "H" of code B and character "3" of code B have the same bit content as character 5 of code A and character & of code A, respectively.

Thereafter, the output line from decoder 10 associated with character W is connected to the output line of decoder 20, which is associated with character Z. These output lines are connected to a connecting means, which is shown as an OR gate 40. The connecting means has an output lead 43 connected to one of the input character lines 31 of encoder 30. Additionally, the output character line of decoder 10 associated with character H is connected to the output line of decoder 20 associated with character 5 through an OR gate 41. Character 3 of code A is similarly connected to character & of code B through an OR gate 42. Not all of the character lines from the outputs of decoders 10 and 20 are shown in FIG. 1. However, the other lines are similarly connected.

From the above, it is seen that it is first determined which characters of code A and code B have the same bit content. For example, it was determined that character Z of code A has the same bit content as character W of code B. Thereafter, character Z of code B at the output of decoder 20 is interconnected in OR gate 40 with character W of code A at the output of decoder 10. Initially, it would seem that a different interconnection, i.e., the characters having the same bit content being interconnected, should have been made. However, the following description of the operation of the bidirectional translator will make it clear that the above interconnection is proper.

The translation of character Z from code B to code A is a typical translation and is, therefore, representative of all translations. Character Z of code B, which has an assumed bit content of 001110, is applied to the input leads of decoder 20. Thereafter, an output will appear on character line 23 of decoder 20 which is associated with character Z. This output signal will be transmitted through OR gate 40 to an appropriate input character line 31 of encoder 30. The encoder will accept this signal, encode it and transfer it to the encoder output where it will appear on the 6 output leads of the encoder as a uniquely coded signal. The output signal will have a code of 111001, which represents character Z in code A. Thus, the translation of character Z of code B from source 4 through decoder 20 and encoder 30 will cause character Z of code A to appear at the output of the encoder. This signal is thereafter coupled into a utilization means 80 for further processing or utilization.

A similar translation occurs in the bidirectional translator of FIG. 1 when it has been determined that a translation from code A to code B is desired and decoder 10 is activated by an input signal on control lead 11 from control circuit 12. Assuming that character $W_A$ having a bit content of 101001 appears on the input leads of decoder 10 from source 2, the decoder will transfer this uniquely coded signal to an individual character line 102. The character line 102 is connected to a second input terminal of OR gate 40. Therefore, the character line 102 of decoder 10, which carries character $W_A$ and the character line of decoder 20, which carries character $Z_B$, are interconnected at the connecting means of OR gate 40. Thereafter, character $W_A$ will cause character $W_B$ to appear at the output of encoder 30 effecting the translation from character $W_A$ to character $W_B$ in the bidirectional translator.

Figure 3:
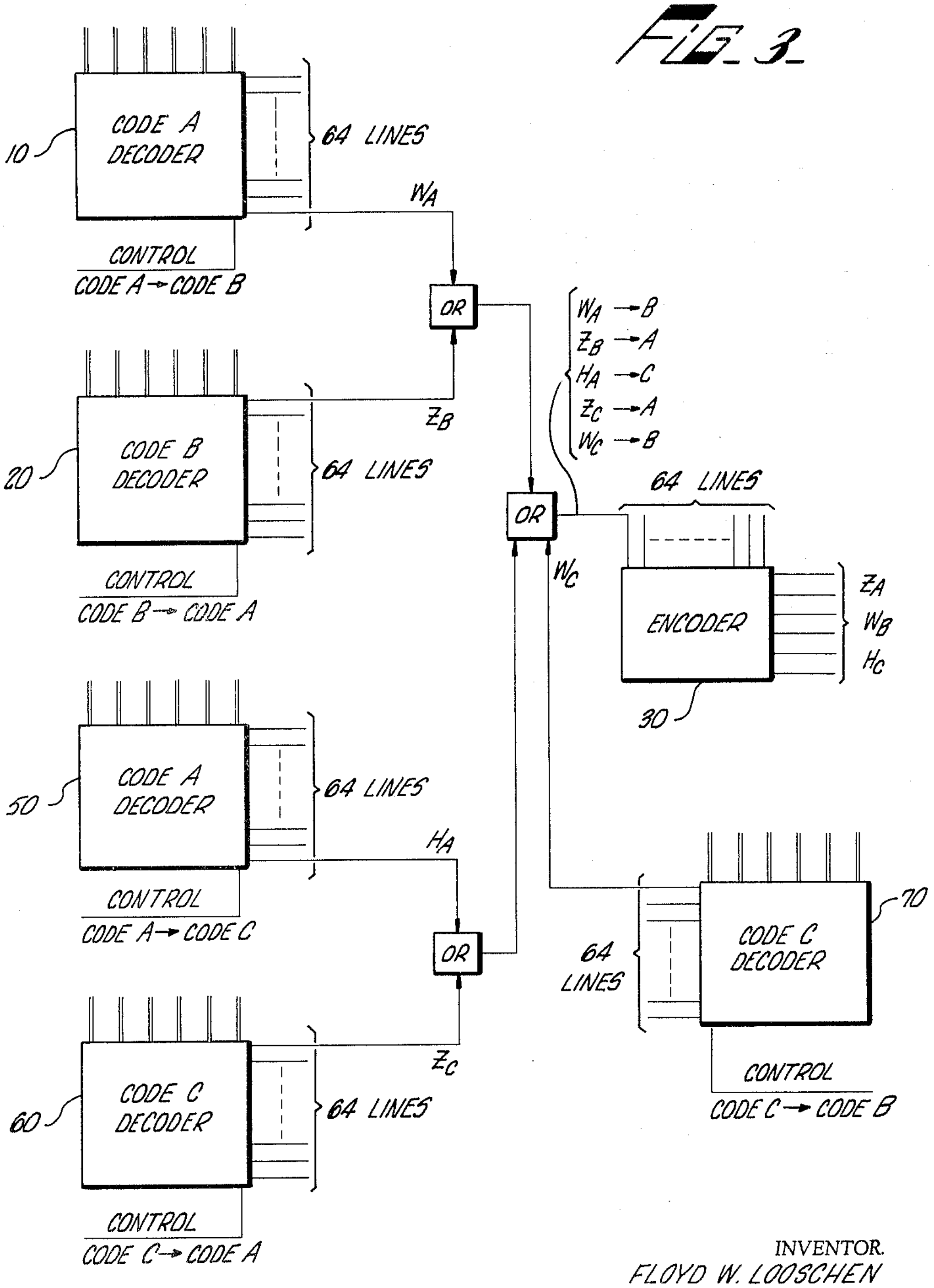
FIG. 3 is a block diagram of a multidirectional translator for a plurality of codes.

This same principle may be applied to a multidirectional translator for the translation between any number of selected codes. A block diagram of such a translator is shown in FIG. 3. The multidirectional translator additionally comprises decoders 50, 60 and 70, which are associated with a third code C. Decoder 50 is provided for the translation between code A and code C. Decoder 60 is provided for the translation between code C and code A, and decoder 70 is provided for the translation between code C and code B. Each decoder will be coupled to a suitable source of coded signals and an individual control circuit, as shown in connection with the bidirectional translator of FIG. 1. Additionally, the encoder 30 will be connected to a utilization means.

For illustrative purposes, it is assumed that character Z of code A, character W of code B, and character H of code C, all have the same bit content. Therefore, character W of decoder 10, character Z of decoder 20, character H of decoder 50, character Z of decoder 60 and character W of decoder 70 are interconnected to one input of the encoder 30 for the translation between the selected codes. All of the other characters will be similarly connected.

Thus, it is seen that one encoder may accept signals from any number of decoders to perform the desired translations. However, for each translation desired there is required an additional decoder.

What is claimed is:

1. A bidirectional translator comprising first means for decoding a plurality of characters represented in a first code to an individual line output, second means for decoding a plurality of characters represented in a second code to an individual line output, and a single encoding means for alternately coding the output of the first decoding means with the second code and coding the output of the second decoding means with the first code.

2. A bidirectional translator comprising a first decoding network having a combination of input leads excited simultaneously by a coded signal to produce an output on an individual output lead, the first network having a control lead to control its operation, a second decoding network having a combination of input leads excited simultaneously by an input signal of a second code to produce an output on an individual output lead, the second network having a control lead to control its operation, and an encoding network having a plurality of input leads, each input of the plurality being separately excited at different times by an output from either the first decoding network or the second decoding network to produce an output on a combination of output leads.

3. A bidirectional translator comprising a first decoding network having a combination of input leads excited simultaneously by an input signal of a first code representing an individual character, the first network decoding the character to an individual output lead, a second decoding network having a combination of input leads excited simultaneously by an input signal of a second code representing an individual character, the second network decoding the character to an individual output lead, an encoding network having a plurality of input leads, each input of the plurality being separately excited at different times by an output from either the first decoding network or the second decoding network to produce an output signal across a combination of output leads, and means for selectively connecting the individual output leads of the first and second decoding networks to the input leads of the encoding network.

4. A bidirectional translator comprising a first source of signals represented in a first code, a second source of signals represented in second code, first means for decoding the signals from the first source, the output signals from the first decoding means appearing on a preselected one of a plurality of output leads to correspond to the received coded signals, a second means for decoding the signals from the second source, the output signals from the second decoding means appearing on a preselected one of a plurality of output leads to correspond to the received coded signals, plurality of means for interconnecting a selected output lead from the first decoding means and a selected output lead from the second decoding means, a single means for alternately encoding the output signals from the first decoding means and from the second decoding means, and means for utilizing the output signals from the encoding means.

5. A bidirectional translator comprising a first source of signals represented in a first code, a second source of signals represented in a second code, first means for decoding the signals from the first source, the output signals from the first decoding means appearing on a preselected one of a plurality of output leads to correspond to the received coded signals, second means for decoding the signals from the second source, the output signals from the second decoding means appearing on a preselected one of a plurality of output leads to correspond to the received coded signals, plurality of means for interconnecting a selected output lead from the first decoding means and a selected output lead from the second decoding means, a single means for alternately and selectively encoding the output signals from the first decoding means and from the second decoding means, means for utilizing the output signals from the encoding means, first means for selectively activating the first decoding means, and a second means for selectively activating the second decoding means .

6. A translator comprising a plurality of individual decoding networks having a combination of input leads excited by one of a plurality of characters represented in a distinct code for producing an output on a preselected output lead for the applied character of that code, an encoding network having a plurality of input leads with only one input lead being excited at a time by the output of one of the decoding networks for producing an output on a combination of output leads with the output being one of a plurality of characters represented in the selected code of translation, and means for connecting the output leads of the decoding networks to selected input leads of the encoding network.

7. A translator comprising a plurality of individual decoding networks having a combination of input leads excited by one of a plurality of characters represented in a distinct code for producing an output on a preselected output lead for the applied character of that code, an encoding network having a plurality of input leads with only one input lead being excited at a time by the output of one of the decoding networks for producing an output on a combination of output leads with the output being one of a plurality of characters represented in the selected code of translation, means for connecting the output leads of the decoding networks to selected input leads of the encoding network, and means for selectively activating each decoding network.

8. A translator comprising a plurality of individual decoding networks having a combination of input leads excited by one of a plurality of characters represented in a distinct code for producing an output on a preselected lead for the applied character of that code, an encoding network having a plurality of input leads with only one input lead being excited at a time by the output of one of the decoding networks for producing an output on a combination of output leads with the output being one of a plurality of characters represented in the selected code of translation, means for interconnecting selected individual output leads of each decoding network, and means for connecting each group of interconnected output leads to a selected input lead of the encoding network.

References Cited by the Examiner

UNITED STATES PATENTS 3,085,236 4/1963 Witt ---------------- 340—347

MALCOLM A. MORRISON, *Primary Examiner.*